United States Patent
Fukushima et al.

(10) Patent No.: US 7,650,610 B2
(45) Date of Patent: Jan. 19, 2010

(54) RECORDING MEDIUM DRIVER AND RECORDER/REPRODUCER

(75) Inventors: Yoshimitsu Fukushima, Tokorozawa (JP); Katsuhiko Tanimoto, Tokorozawa (JP); Takeshi Hamada, Tokorozawa (JP); Yuji Morita, Tokorozawa (JP); Hitoshi Nagata, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 314 days.

(21) Appl. No.: 10/589,254

(22) PCT Filed: Feb. 10, 2005

(86) PCT No.: PCT/JP2005/002007

§ 371 (c)(1),
(2), (4) Date: Aug. 14, 2006

(87) PCT Pub. No.: WO2005/078720

PCT Pub. Date: Aug. 25, 2005

(65) Prior Publication Data

US 2007/0169134 A1    Jul. 19, 2007

(30) Foreign Application Priority Data

Feb. 13, 2004    (JP) .............................. 2004-036780

(51) Int. Cl.
*G11B 17/04* (2006.01)
(52) U.S. Cl. .................................................. 720/605
(58) Field of Classification Search ........................ None
See application file for complete search history.

(56) References Cited

U.S. PATENT DOCUMENTS 5,974,016 A * 10/1999 Andrews et al. ............ 720/626
7,069,564 B2 * 6/2006 Naoki ........................ 720/601

FOREIGN PATENT DOCUMENTS

| JP | 59-138053 | 9/1984 |
|---|---|---|
| JP | 7-220380 | 8/1995 |
| JP | 7-334903 | 12/1995 |
| JP | 9-259498 | 10/1997 |
| JP | 11-259950 | 9/1999 |
| JP | 2001-135007 | 5/2001 |
| JP | 2002-124000 | 4/2002 |
| JP | 2003-77260 | 3/2003 |
| JP | 2005-4951 | 1/2005 |

OTHER PUBLICATIONS

Office Action dated Mar. 31, 2009 issued for the relevant Japanese patent application No. 2005-517964.

* cited by examiner

*Primary Examiner*—Mark Blouin
(74) *Attorney, Agent, or Firm*—Kratz, Quintos & Hanson, LLP

(57) ABSTRACT

A detection hole 34 is provided in a tray 30, on which a cartridge type recording medium is mounted and housed, at a position corresponding to an information hole of a cartridge, a detection lever 35 is provided on a back surface of the tray 30 on the lower surface side of the detection hole 34, and a switch section 111 is provided on a frame 10 on the lower surface side of the detection lever 35 while the tray 30 is housed within the frame 10. Accordingly, the switch section 111 can be separated from the motion of a base since the switch section 111 is fixed to the frame 10, and consequently, the structure can be simplified and the space efficiency can be enhanced.

5 Claims, 10 Drawing Sheets

RECORDING MEDIUM DRIVER AND RECORDER/REPRODUCER

TECHNICAL FIELD

The present invention relates to a recording medium driver that can house a recording medium therein and to a recorder/reproducer.

BACKGROUND ART

Conventionally, a cartridge type recording medium has been known, in which a disc is accommodated inside a cartridge for preventing the disc from being contaminated or damaged due to dusts or the like. Information related to the state of such recording medium can be detected, for example, according to a condition of an opening formed in the cartridge. For instance, information can be written on the recording medium if the opening is in an opened condition, whereas information cannot be written on the recording medium if the opening is in a closed condition. Additionally, a recording medium having a hole formed in a cartridge has been known, the hole indicating a state or type of the recording medium.

There has also been known a disc drive which can house the above-described cartridge type recording medium (e.g., Patent Document 1). The disc drive disclosed in Patent Document 1 includes a servomechanism chassis provided with a turntable for rotatably holding a recording medium and a pickup for recording/reproducing information on/from the recording medium. A base end of the servomechanism chassis is pivotally supported such that the rotation force is vertically applied. Conventionally, a switch section of a lead-in detection switch, write-protect switch, cartridge detection switch, or the like is provided on a tip end of the servomechanism chassis. Owing to this, vertical movement of the servomechanism chassis in a cartridge direction allows some of the switches to detect an information hole formed in the cartridge.

[PATENT DOCUMENT 1] JP-A-9-259498 (4 page, FIGS. 4, 5 and 6)

DISCLOSURE OF THE INVENTION

Problems to be Solved by the Invention

However, in the configuration of Patent Document 1 in which the switch section of the write-protect switch, the cartridge detection switch, or the like is moved along with the servomechanism chassis, since the switch section is vertically moved along with the movement of the turntable provided on the servomechanism chassis to hold the recording medium, space efficiency may be degraded. Also, since the switch section is required to be moved such that the switch section does not interrupt feeding movement of the recording medium in this time, the mechanism may be complicated.

Considering the above-described circumferences of the present invention, an object of the present invention is to provide a recording medium driver and a recorder/reproducer for detecting information of a cartridge with a simple configuration as well as enhancing space efficiency.

Means for Solving the Problems

A recording medium driver according to an aspect of the invention set forth in claim 1 drives a recording medium, the driver being able to detect information related to a state of a recording medium body accommodated in a cartridge according to whether an information hole formed in the cartridge is opened or closed. The driver, includes: a tray including a mount surface on which the recording medium is mounted and being capable of housing the recording medium within a frame; a detection section that can be come up from/come down into the mount surface of the tray and is projected from the mount surface to detect that the information hole is opened; and a switch section disposed on a frame side to detect whether the detection section is come up or come down and to acquire the information related to the state of the recording medium.

A recorder/reproducer according to another aspect of the invention set forth in claim 6, includes: the recording medium driver set forth in any one of claims 1 to 5, in which the recorder/reproducer records information on or reproduces information from the recording medium.

EXPLANATION OF CODES

Figure 1:
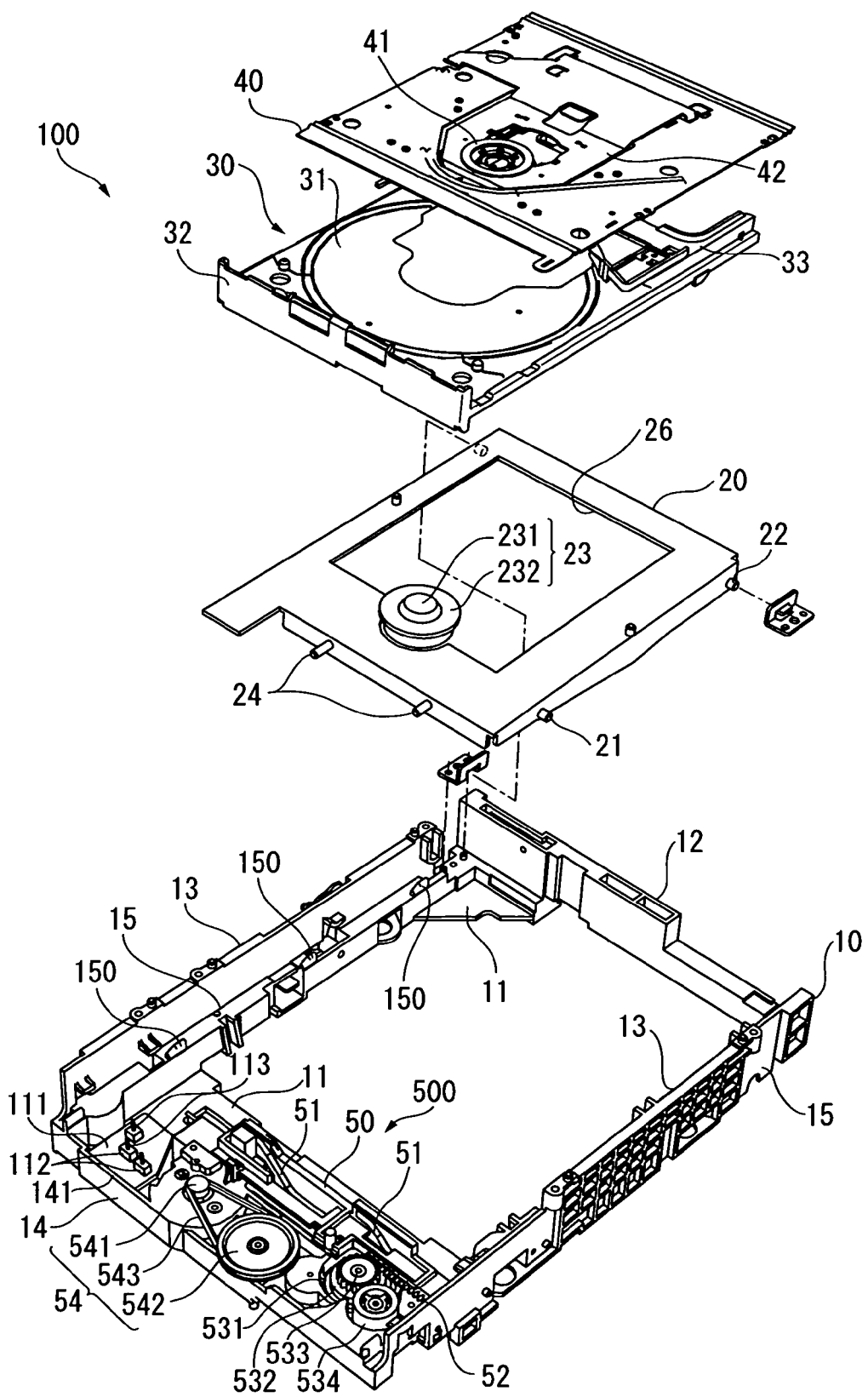
FIG. 1 is an exploded perspective view showing a recording medium driver according to a first embodiment of the present invention.

30 . . . tray
35 . . . detection lever as detection section
111 . . . switch section
112 . . . switch body
113 . . . switch pin
351 . . . lever head as detection section
352 . . . lever pin as detection section
353 . . . plate spring as resilient member

BEST MODE FOR CARRYING OUT THE INVENTION

An embodiment of the present invention will be described below with reference to the drawings. FIGS. 1 to 6 each show a recording medium driver of the embodiment.

[Configuration of Recording Medium Driver]

FIG. 1 is an exploded perspective view showing the recording medium driver of the present embodiment. In FIG. 1, numeric reference 100 represents the recording medium driver. The recording medium driver 100 houses a recording medium therein and records information on the recording medium or reproduces information recorded on the recording medium. The recording medium housed in the recording medium driver 100 may be a bare disc type recording medium using an optical disc such as a CD (Compact Disc), DVD (Digital Versatile Disc), etc. in a bare manner, or may be a cartridge type recording medium accommodating such an optical disc in a cartridge. Alternatively, it is also preferable to use a magnetic disk such as a flexible disk as the recording medium without limiting to the optical disc. The recording medium driver 100 may be housed in terminal equipment like a personal computer or in audio equipment, or may be an external drive to be installed at the outside of the terminal equipment or audio equipment. Note that the recording medium driver is not limited to be used as peripheral equipment of the above-described terminal equipment or audio equipment, and may be a driver like a portable CD player which can solely be used, or is applicable to various drivers that drive the recording medium using the optical discs or magnetic disks.

Figure 2:
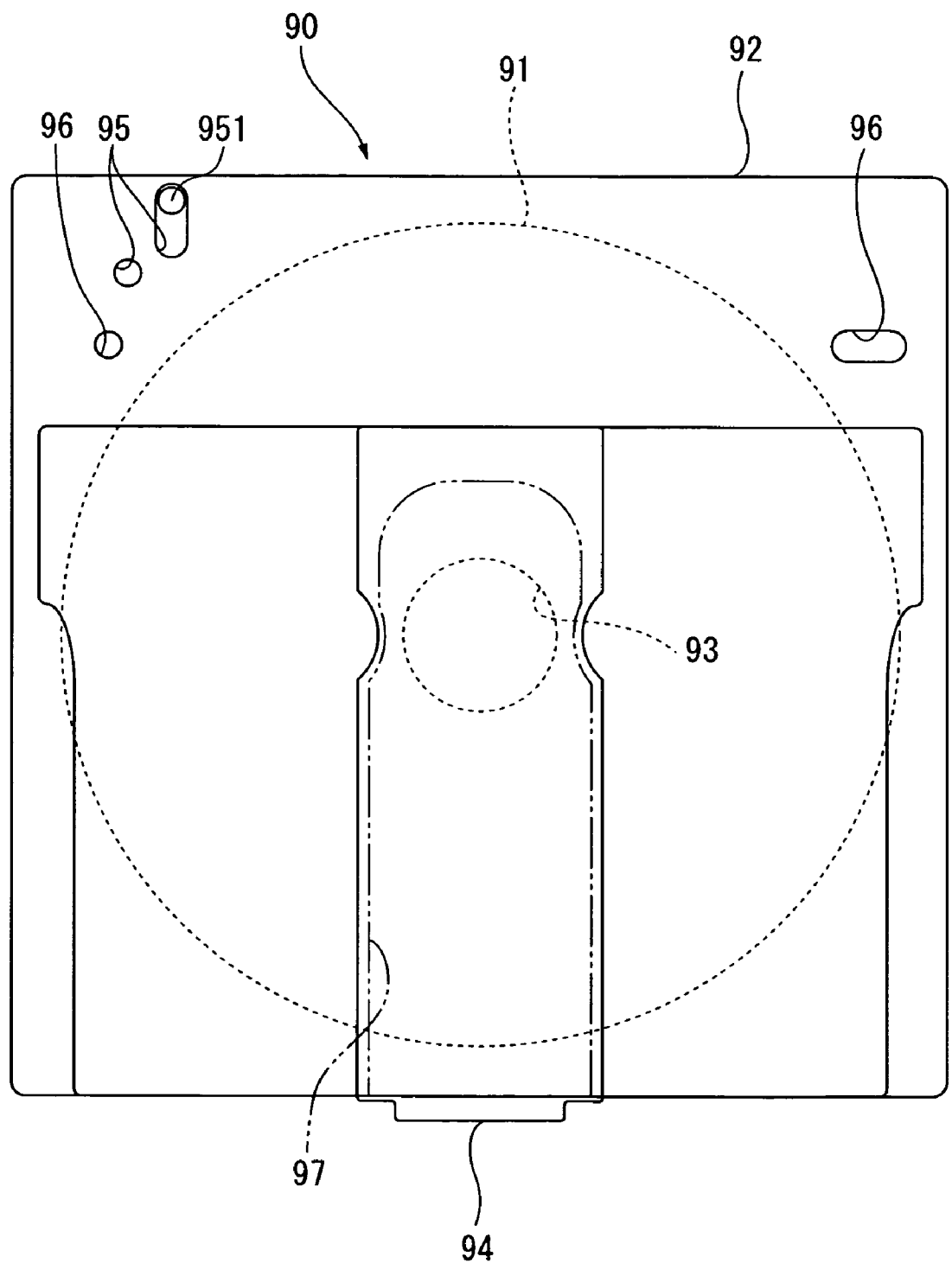
FIG. 2 shows a front elevation showing a cartridge type recording medium which is an example of a recording medium mounted on the recording medium driver.

FIG. 2 is a front elevation showing the cartridge type recording medium as an example of the recording medium to be used for the recording medium driver 100. In FIG. 2, a disc 91 has a circular hole 93 at the center, and a recording surface is formed on a surface of the disc 91. A cartridge 92 accommodates the disc 91 for protecting the recording surface of the disc 91 from dusts and damages. In the cartridge 92, an opening 97 is formed to the center from the outer circumference, so that the disc 91 can be reproduced and/or recorded via the opening 97. A cover 94 is slidably provided over the opening 97 to protect the disc 91. The cover 94 allows the opening 97 to be opened by sliding in a lateral surface direction of the cartridge 92 while reproducing/recording operation of the disc 91 is performed, whereas it allows the opening 97 to be closed for protection of the disc 91 while the reproducing/recording operation of the disc 91 is not performed.

Also, an information hole 95 is formed on an end portion or both end portions of the cartridge 92. The information hole 95 is provided with a switching portion 951 for switching a state between write enable and write inhibit, so that the switching at the switching portion 951 can change information related to the state of a cartridge type recording medium 90. Note that the information hole 95 of the cartridge 92 is not limited to one that switches the state between the write enable and the write inhibit, and may be the information hole 95 indicating other information, e.g., the information hole 95 that indicates the type of the cartridge type recording medium 90, the information hole 95 that indicates the memory capacity of the cartridge type recording medium 90, or the like. Also, the information hole 95 may not be provided with the switching portion 951, and in such case, the information related to the state of the cartridge type recording medium 90 may be obtained by recognizing the presence of the information hole 95.

Back to FIG. 1, the recording medium driver 100 includes a substantially planarly rectangular frame 10, a base 20 attached inside the frame 10, a tray 30 allowed to be ejected from/inserted to the frame 10, a clamp mechanism 40 disposed on the upper surface of the frame 10, and a metal casing (not shown) surrounding the outer circumferential surface of the frame.

(Configuration of Frame)

The frame 10 is a member made of synthetic resin or the like. The frame 10 is substantially formed in a box, in which a bottom portion 11 is a substantially planarly rectangular plate. The frame 10 includes a rear portion 12 integrated with one of narrow sides of the periphery of the bottom portion 11, a front portion 14 integrated with the other one of the narrow sides of the periphery of the bottom portion 11 in a rising manner, and two lateral portions 15 respectively integrated with wide sides of the periphery of the bottom portion 11, to form an upper opening 13 surrounded by the lateral portions 15 and the rear portion 12 and confronting the bottom portion 11.

In the recording medium driver 100, regardless of installing the recording medium driver 100 vertically or horizontally, the upper opening 13 side is defined as an upper surface side, the opposite bottom portion 11 side is defined as a lower surface side, the rear portion 12 side is defined as a rear surface side, and the front portion 14 side is defined as a front surface side. Also, a direction along the front surface side to the rear surface side is assumed as an advance/retraction direction, a direction to the upper surface from the lower surface is assumed as a vertical direction, and a direction to the lateral surface orthogonal to the advance/retraction direction and the vertical direction is assumed as a lateral surface direction.

The lateral portion 15, the front portion 14 and the rear portion 12 are provided on the periphery of the bottom portion 11, and a hollow portion is formed inside these. The hollow portion is a space where an electric circuit (not shown) is housed, the electric circuit controlling the operation of the recording medium driver 100. On the front surface side of the bottom portion 11, a switch section 111 is provided. The switch section 111 includes a switch body 112, and a switch pin 113 that can be advanced and retracted to the upper surface side from the switch body 112.

The switch section 111 is a circuit board with a circuit (not shown) formed on a surface thereof. The switch body 112 is fixed at a predetermined position of the switch section 111. The circuit of the switch section 111 is electrically connected to the switch body, and also electrically connected to an electric circuit provided in the hollow portion via a wiring (not shown), for instance, a flexible board. Accordingly, when the switch pin 113 provided on the switch body 112 is pushed down by a below-described detection lever provided on the tray 30, a predetermined signal is output to the electric circuit of the hollow portion from the switch body 112 via the circuit formed on the switch section 111. The signal output to the electric circuit from the switch body 112 may be a signal indicating that the cartridge type recording medium 90 is inserted, a signal indicating the write enable or write inhibit, etc.

The rear portion 12 has an external terminal section on the lower surface side, the external terminal section being electrically connected with the electric circuit provided on the bottom portion 11 within the frame. The external terminal section, for instance, may include a power cable connector for supplying power to the recording medium driver, an external terminal connector for allowing external equipment such as a personal computer to be connected, or the like. The information to be reproduced/recorded by the recording medium driver 100 is mainly input/output via the external terminal section.

On an inner wall of the lateral portion 15, a sliding piece 150 slidably supporting the tray 30 provided along the advance/retraction direction. Also, the base 20 is swingably attached on the rear surface side of the lateral portion 15.

The front portion 14 is so formed that a dimension in the vertical direction in the drawing is smaller than that of the rear portion 12 and the lateral portion 15, and a front opening 141 through which the tray 30 is ejected or inserted is formed on the upper surface side of the front portion 14. In addition, an operation section (not shown) is provided on the front portion 14, the operation section being connected with the electric circuit provided on the bottom portion 11. For instance, the operation section includes an eject button by which the tray 30 is ejected or inserted, a volume control for adjusting the volume, an insertion port of an earphone, and the like.

(Configuration of Base Member)

The base 20 is formed with a metal plate by press molding etc. The base 20 is rotatably attached on the rear surface side of the lateral portion 15 of the frame 10 in a manner that the base 20 can be advanced and retracted in the vertical direction. A planarly circular disc table 23 is mounted on the base 20 at a position away from the front surface side of the base 20 by a predetermined distance and substantially at the center in the lateral surface direction, the disc table 23 being rotatable around the vertical direction as a rotation axis. The disc table 23 interlocks with the rotation of the base 20 to be advanced/retracted in the vertical direction. The disc table 23 is projected to the upper surface side relative to the upper surface of the base 20. On the lower surface side of the disc table 23, a rotary drive mechanism (not shown) such as a motor or the like is provided, the rotary drive mechanism being electrically connected with the electric circuit via a flexible board etc. made of synthetic resin with a pattern wiring embedded therein. As an electric signal for a driving instruction is transmitted from the electric circuit, the rotary drive mechanism rotates the disc table 23 at high speed.

The disc table 23 includes a mount portion 232 on which the recording medium is mounted, and a tapered portion 231 provided at the center of the mount portion 232 with the upper surface side of the tapered portion 231 decreasing in diameter. The tapered portion 231 is engaged with the circular hole of the disc. Also, a magnet (not shown) is fitted into the upper surface side of the tapered portion 231, and a synthetic resin sheet member (not shown) is bonded on the upper surface side of the mount portion 232 for protection and anti-slip purposes. The provision of the sheet member prevents the recording medium from being slipped even when the disc table 23 rotates at high speed, thus providing high-speed access to the information recorded on the recording medium.

A recording/reproducing mechanism setting hole 26 is formed in the base 20 at a portion to the rear surface side relative to the disc table 23, and a recording/reproducing mechanism (not shown) is provided at the recording/reproducing mechanism setting hole 26. The recording/reproducing mechanism is a device that irradiates laser beam on the recording surface of the recording medium to record and/or reproduce information, the recording/reproducing mechanism being able to be advanced/retracted along a front surface-rear surface direction of the recording/reproducing mechanism setting hole 26 of the base 20. A synthetic resin flexible cable (not shown) is connected with a part of the recording/reproducing mechanism, so that the recording/reproducing mechanism is connected with the electric circuit via the flexible cable.

(Configuration of Tray)

Figure 3:
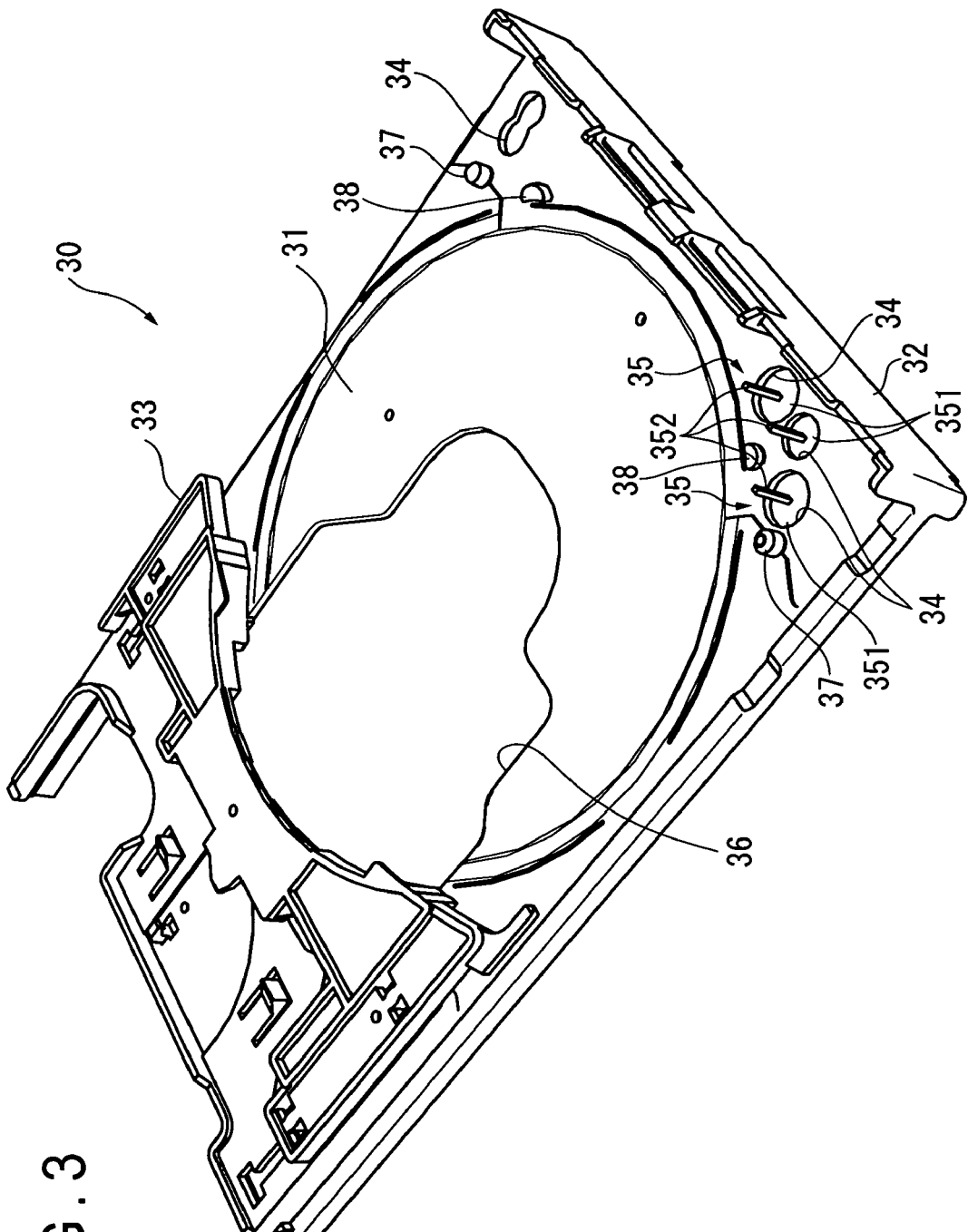
FIG. 3 is an overall perspective view showing a tray.
Figure 4:
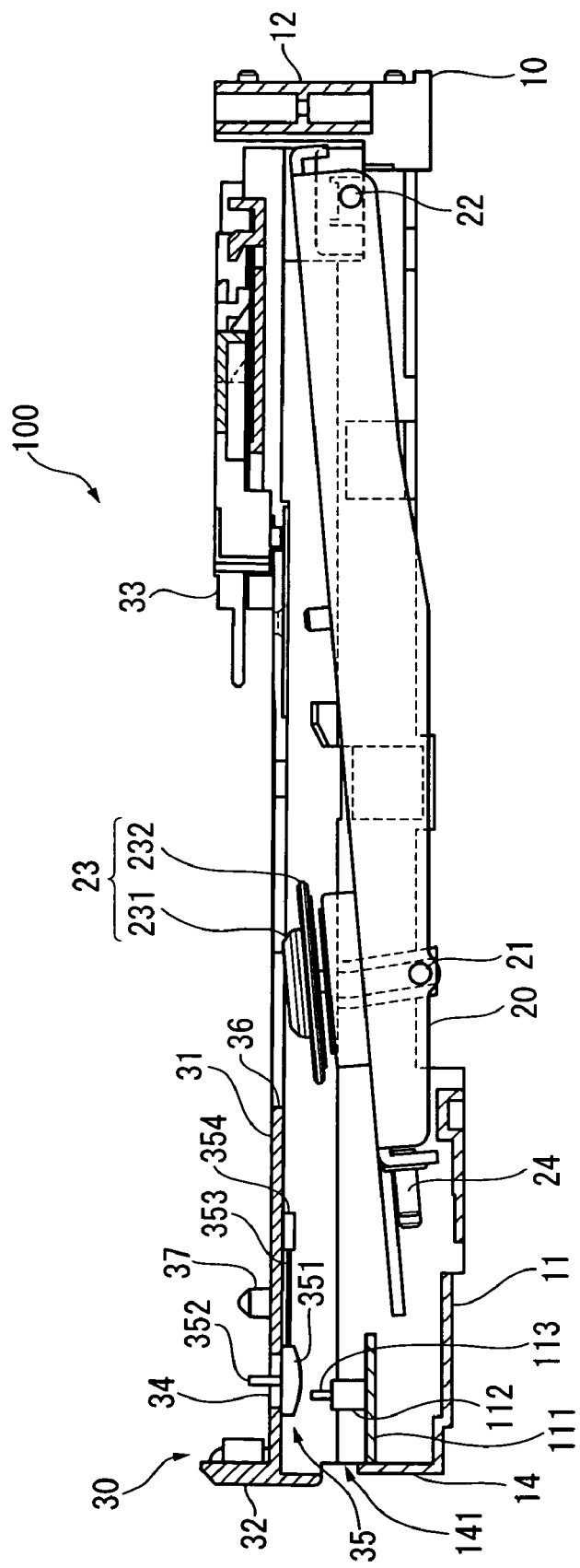
FIG. 4 is a cross section of the recording medium driver with the view being vertically cut along an advance/retraction direction thereof.

FIG. 3 is a perspective view showing the tray 30. FIG. 4 is a cross section of the recording medium driver 100 with the view being vertically cut along the advance/retraction direction thereof.

The tray 30 is a member made of synthetic resin such as ABS resin, which allows the recording medium like a CD or DVD to be mounted thereon and housed inside the recording medium driver. The tray 30 includes a planarly rectangular mount surface 31, and a rising portion 32 standing on the front surface side of the periphery of the mount surface 31. In the lateral surface on the lower surface side of the tray 30, a linear groove (not shown) is integrally formed along the advance/retraction direction of the tray 30, and the sliding piece 150 of the lateral portion 15 is engaged with the groove. The tray 30 can smoothly be advanced/retracted in the advance/retraction direction by the groove and the sliding piece 150.

The mount surface 31 is a surface on which the optical recording medium such as a CD or DVD is mounted. A hole is provided substantially at the center of the mount surface 31, so that when the tray 30 is housed within the frame 10, the disc table 23 is projected to the mount surface 31 side via the hole and holds the recording medium. Also, a pickup which is an information reproducing mechanism is advanced/retracted via the hole with respect to the recording surface of the recording medium, allowing the recording medium to be reproduced and/or recorded. On the mount surface 31, either one of the cartridge type recording medium 90 and the bare disc type recording medium can be mounted, and a circular recessed portion is formed for allowing the bare disc type recording medium to be mounted. p A detection hole 34 is provided on the front surface side of the mount surface 31 of the tray 30. A detection lever 35 as a detection section is provided on the lower surface side (on the side where a below-described fixing portion 354 is disposed as well as the side opposite to the mount surface of the tray 30) of the detection hole 34.

The detection lever 35 includes a lever head 351 as a support portion, and a lever pin 352 as a pin provided on the lever head 351. An end of a plate spring 353 as a biasing member is arranged on the lever head 351, while the other end of the plate spring 353 is fixed at the fixing portion 354 on the back surface of the tray 30.

The lever head 351 is formed by a lightweight member such as synthetic resin. The lower portion of the lever head 351 is defined by a curved surface or by two or more planes. When the lever head 351 is pushed down to the lower surface side, the lower portion of the lever head 351 substantially perpendicularly abuts on the switch pin 113 to push the switch pin 113. Also, the lever head 351 is biased by the plate spring 353 from the back side of the tray 30 to the mount surface side of the tray 30. Then, while the tray 30 is housed in the recording medium driver 100, the switch pin 113 of the switch body 112 is disposed on the lower surface side of the lever head 351. In addition, the area of the lever head 351 confronting the back surface of the tray 30 is set to be greater than the hole area of the detection hole 34, so that the lever head 351 will not be projected to the mount surface 31 side from the detection hole 34.

The lever pin 352 is fixed on the lever head 351 such that the lever pin 352 passes through the detection hole 34 and is projected to the mount surface side. The lever pin 352 and the lever head 351 are formed to be advanced/retracted in the vertical direction relative to the tray 30 by the plate spring 353. Then, as the lever pin 352 is pushed down by receiving a force from the mount surface 31 side, the lever head 351 is pushed down simultaneously. When the tray 30 is housed within the frame 10, the lever head 351 pushes the switch pin 113 fixed on the bottom portion 11 of the frame 10 as described above, so that a predetermined signal is output to the electric circuit from the switch body 112.

For example, the fixing portion 354 may be so formed that a part of the tray 30 is projected to the lower surface side and the plate spring 353 is fixed by holding it with that projecting portion, or alternatively, the fixing portion 354 may be fixed on the tray 30 directly by screwing, bonding with an adhesive, welding, etc. Note that the fixture of the plate spring 353 with the fixing portion 354 may not limited to the above-described fixture method, and may employ other fixture methods.

In addition, a guiding projection 38 is provided along the periphery of the circular recessed portion of the tray 30. The guiding projection 38 is provided in a manner that can be come up from/come down into the surface of the mount surface 31. When the bare disc type recording medium is mounted on the circular recessed portion of the mount surface 31, the guiding projection 38 guides the bare disc type recording medium not to be deviated and dropped from the circular recessed portion. When the cartridge type recording medium is mounted on the mount surface 31, the guiding projection 38 is pushed down to the back surface side of the tray 30, and will not be projected relative to the mount surface 31.

Further, a cartridge positioning projection 37 is provided on a predetermined position of the mount surface 31. The cartridge positioning projection 37, when the cartridge type recording medium is mounted on the tray 30, positions the cartridge with respect to the mount surface 31 by engaging with a positioning hole 96 provided on the cartridge.

The substantial center of the mount surface 31 of the tray 30 is a position to which the disc table 23 is inserted, and an operation hole 36 is formed toward the rear surface direction relative to that position. The operation hole 36 allows the disc table 23 engaged with the recording medium mounted on the mount surface 31 to be inserted, and also is defined as a passing portion of the laser beam irradiated to the recording surface of the recording medium from the recording/reproducing mechanism that performs reproducing/recording of the recording medium.

The rising portion 32 covers the front surface side of the tray 30 to function as a cover hiding the front opening 141. Also, while the recording medium is not held by the disc table 23, the recording medium is prevented from being dropped from the mount surface 31 to the front surface side.

Further, the space surrounded by the lower portion of the rear surface side of the rising portion 32 and the back surface side of the tray 30 represents a moving space of the switch pin 113 and the lever head 351, and within this space, the lever head 351 and the switch pin 113 are vertically advanced/retracted.

On the rear surface side of the tray 30, a slider 33 made of synthetic resin or the like is attached as a positioning member for the recording medium. The slider 33 is biased on the front surface side using a resilient member (not shown) such as a spring etc. The slider 33 functions as a guide for the bare disc on the rear surface side of the tray while being biased on the front surface side. When the cartridge is mounted, the slider guides the cartridge to be mounted on the tray by sliding to the rear surface side of the tray in order to correspond the difference between respective external forms of the cartridge and the bare disc.

(Detection of Information Related to Recording Medium State)

Figure 5:
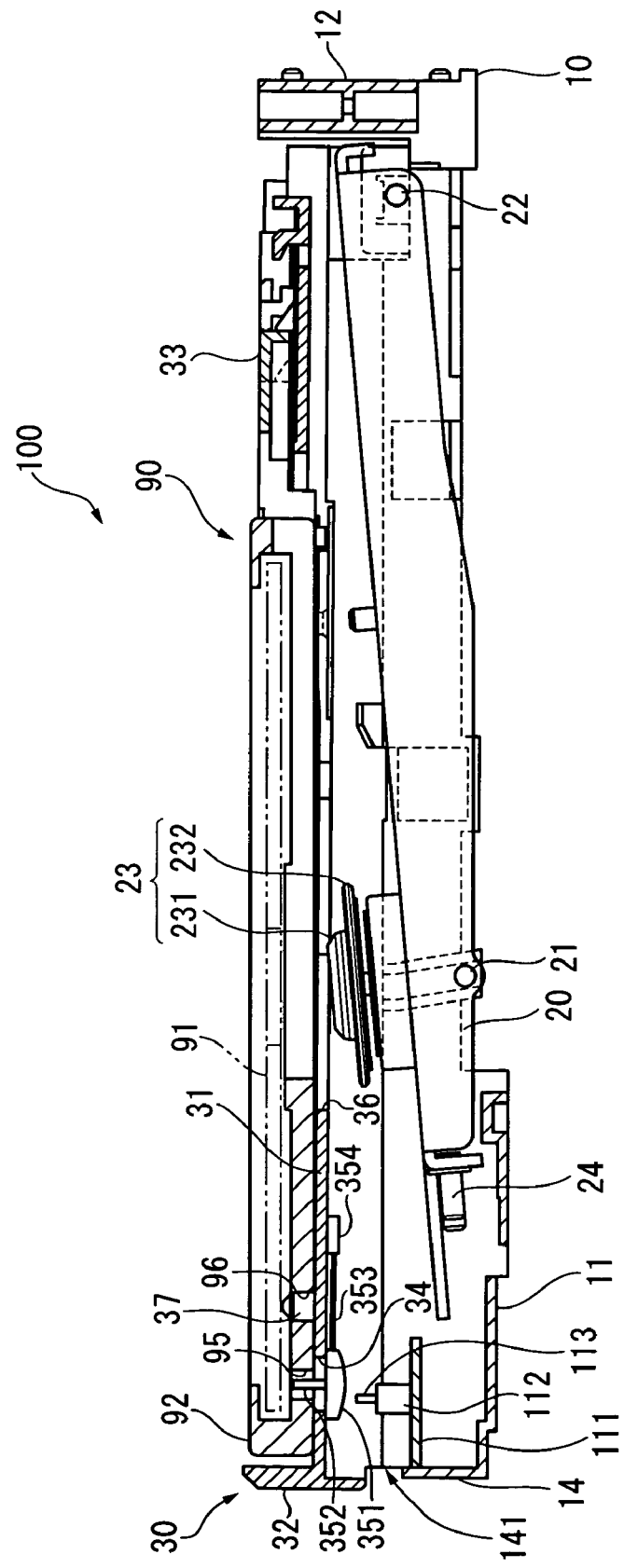
FIG. 5 is a cross section showing a state where the cartridge type recording medium is mounted on the tray in FIG. 4.
Figure 6A:
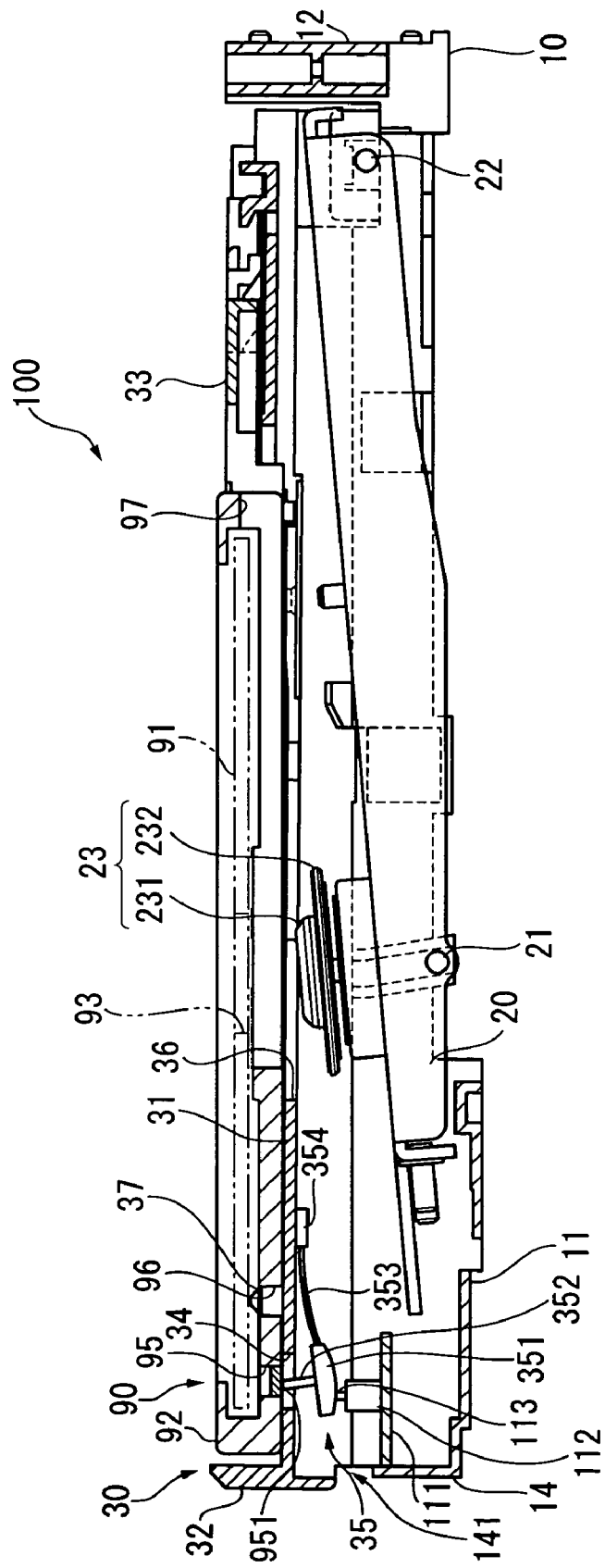
FIG. 6A is a cross section showing a state where the tray is housed within a frame with the cartridge type recording medium mounted on the tray.
Figure 6B:
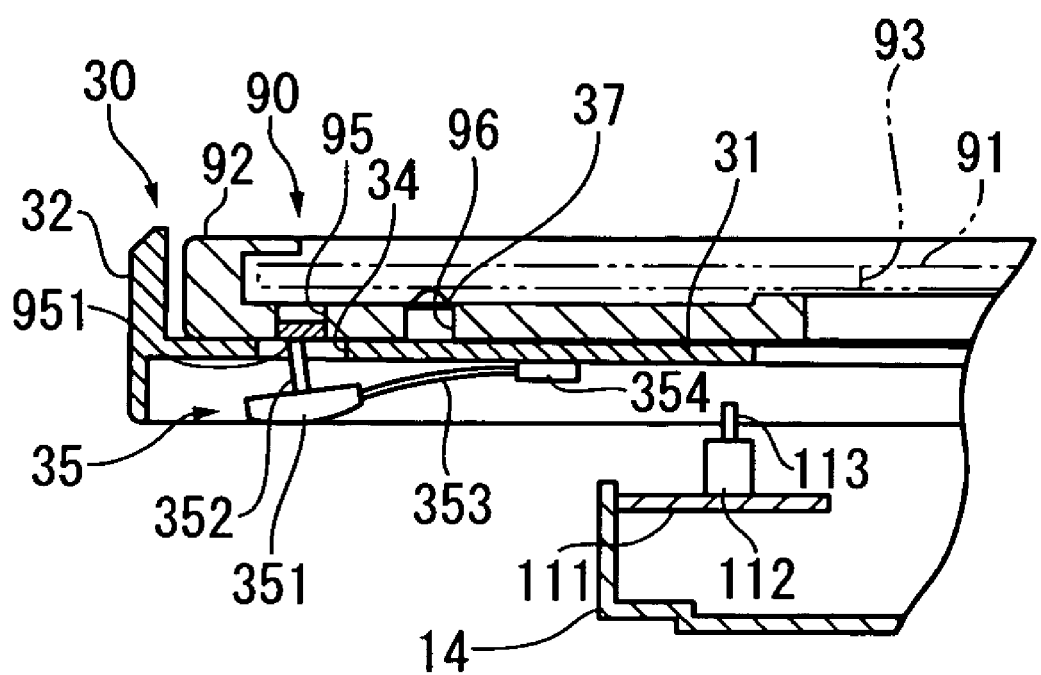
FIG. 6B is a cross section showing a state where the tray is ejected from the frame via a front surface side thereof with the cartridge type recording medium mounted on the tray.

FIG. 5 is a cross section showing a state where the cartridge type recording medium 90 is mounted on the tray 30 in FIG. 4 with the information hole 95 opened. FIG. 6A is a cross section showing a state where the cartridge type recording medium 90 is mounted on the tray 30 in FIG. 4 with the information hole closed and the tray 30 is housed within the frame 10. FIG. 6B is a cross section showing a state where the cartridge type recording medium 90 is mounted on the tray 30 in FIG. 4 with the information hole closed and the tray 30 is ejected from the front surface side of the frame 10.

The detection hole 34 is provided at a position corresponding to the position of the information hole 95 of the cartridge 92, and the lever pin 352 is projected via the detection hole 34. As shown in FIG. 5, if the information hole 95 of the cartridge 92 is opened, the tip end of the lever pin 352 extends into the information hole 95 of the cartridge, so that the disc 91 can be determined as write inhibit (see FIG. 5) by way of the lever head 351.

On the other hand, as shown in FIGS. 6A and 6B, if the information hole 95 of the cartridge 92 is closed with the switching portion 951 or the information hole 95 is not provided, when the tray 30 is ejected from the front surface side of the frame 10 and the cartridge 92 is mounted on the tray 30, the lever pin 352 abuts on the switching portion 951 or the outer circumference of the cartridge 92 and to be pushed down together with the lever head 351. When the tray 30 is housed within the frame 10, the lever head 351 pushes the switch pin 113 of the switch body 112 arranged on the lower surface side, the switch body 112 outputs a signal indicating that the switch pin 113 is pushed, to the electric circuit, and thus the disc 91 can be determined as write enable (see FIG. 6A). Note that, as described above, the information hole 95 of the cartridge 92 may not only show the state between the write enable and the write inhibit. There may be the information hole 95 indicating other information, e.g., the information hole 95 that indicates the type of the cartridge type recording medium, the information hole 95 that indicates the memory capacity of the cartridge type recording medium, or the like. The detection lever 35 detects the information hole 95 and outputs a signal corresponding to the information to the electric circuit via the switch body 112 of the switch section 111.

(Configuration of Clamp Mechanism and Holding of Recording Medium)

On the upper opening 13 of the frame 10, the clamp mechanism 40 is attached, the clamp mechanism 40 holding the recording medium engaged with the disc table 23 not to be released from the disc table 23. The clamp mechanism 40 includes a damper 41 at a position confronting the disc table 23, the damper 41 being supported by a damper holder 42. The damper 41 is made of synthetic resin and has a disc metal member (not shown) fitted to the upper surface side of the central portion thereof. The damper holder 42 has a plate spring (not shown) to bias the damper holder 42 to the lower surface side.

In the recording medium driver 100 having the clamp mechanism 40, for example, a disc is used as a recording medium, the disc is mounted on the mount surface 31 of the tray 30 and the tray 30 is housed within the frame 10. In this case, the circular hole 93 formed in the disc of the recording medium is engaged with the tapered portion 231 of the disc table 23, and the disc is mounted on the sheet member (not shown) of the mount portion 232. Since the magnet (not shown) is fitted into the tapered portion 231 of the disc table 23, the damper 41 is attracted to the disc table 23 side due to the magnet of the disc table 23 and the disc can be held by the damper 41, thereby the disc being fixed not to be released from the disc table 23. Accordingly, the disc table 23 will not be released from the disc table even when the optical disc is rotated at high speed during reproducing and/or recording.

In removal of the disc, the disc table 23 is moved to the lower surface side, the magnet is separated from the damper 41, and the damper 41 is pushed up to the upper surface side together with the damper holder 42 due to the cam mechanism (not shown). Then, when the disc table 23 is moved to the lower surface side relative to the mount surface 31, the disc is mounted on the upper surface side of the mount surface 31, and the recording medium can be removed by ejecting the tray 30 from the frame 10.

(Interlock of Base Member 20 and Tray)

In FIGS. 1 and 4, an interlocking mechanism 500 is provided on the front surface side of the base 20. The interlocking mechanism 500 includes a drive cam 50 engaged with the base 20, a first rack 52 integrally formed with the drive cam 50, a gear mechanism 53 meshed with the first rack 52 and having a first gear 531 through a fourth gear 534, a motor 54 meshed with the gear mechanism 53 and being driven by the control of the electric circuit, and a second rack (not shown) provided on the lower surface side of the tray 30 and meshed with the gear mechanism 53.

The drive cam 50 is made of synthetic resin or the like, which is reciprocatingly arranged in the lateral surface direction that is orthogonal to the advance/retraction direction of the tray 30. A cam groove 51 extending to the lateral surface direction is formed on the rear surface side of the drive cam 50, and a cam engagement pin 24 of the base 20 is engaged with the cam groove 51. The cam groove 51 is sloped at the intermediate portion in the lateral surface direction such that an end is disposed on the upper surface side while the other end being disposed on the lower surface side. The reciprocating motion of the drive cam 50 in the lateral surface direction causes the cam engagement pin 24 to be moved between the both ends of the cam groove 51 along the sloped portion, and accordingly, the base 20 can reciprocatingly be moved in the vertical direction.

The first rack 52 formed on one lateral surface of the drive cam 50 is meshed with the third gear 533 of the gear mechanism 53. The second gear 532 greater in diameter than the third gear 533 is integrally formed on the lower surface side of the third gear 533, and the second gear 532 is meshed with the first gear 531. Also, the third gear 533 is meshed with the fourth gear 534.

The first gear 531 is meshed with a motor gear 542 of the motor 54. The motor gear 542 is interlocked with a wheel 541 via a ringed belt 543 made of synthetic resin. A motor body (not shown) is provided on the lower surface side of the wheel 541 with the frame 10 interposed, and a driving force is directly provided by the motor body. The motor body is electrically connected with the electric circuit, which controls the rotation of the motor body.

The fourth gear 534 is meshed with the second rack (not shown) provided on the lower surface side of the tray 30.

When a tray advance/retraction instruction is conveyed to the electric circuit by the eject button (not shown) provided on the front portion 14 of the frame 10 or by an input from the outside, the electric circuit drives the motor body. As the motor body rotates, the rotation is transmitted to the first gear 531 of the gear mechanism 53 via the motor gear 542. Then, the rotation energy is transmitted from the first gear 531 to the second gear 532 to rotate the third gear 533 integrally provided with the second gear as well as the fourth gear 534 meshed with the third gear 533. Due to the rotation of the third gear 533, the drive cam 50 meshed with the third gear 533 in the first rack 52 is moved in the lateral surface direction, so that the base 20 engaged with the drive cam 50 is moved to the upper surface side or the lower surface side. In addition, by the rotation of the fourth gear 534, the tray 30 meshed with the fourth gear 534 in the second rack is moved to the rear surface side or the front surface side.

As stated above, the base 20 and the tray 30 are interlocked to each other by the drive cam 50 and the gear mechanism 53. Incidentally, when the tray 30 is ejected, the tray 30 should be ejected after the disc table 23 is moved to the lower surface side. This can be realized according to the restriction of the tray 30 to slide relative to the second rack. In particular, the tray 30 is so set that the tray 30 can slide relative to the second rack only by a predetermined distance, for instance. In such case, when the eject instruction of the tray 30 is given by the eject button etc., the motor 54 is driven, and the base is moved to the lower surface side due to the interlocking mechanism 500. At the same time, although the fourth gear 534 also rotates and the second rack interlocks thereto, since the second rack is so provided that the second rack can slide relative to the tray 30 only by a predetermined distance, only the second rack is moved to the front surface side for the predetermined distance. When the base 20 is moved to the lower surface side to secure a space not to interfere with the tray 30, the second rack then is engaged with the tray 30 to move the tray 30 to the front surface side. In addition, a play adjustment mechanism (not shown) is provided to restrict the tray 30 to slide relative to the second rack when the tray 30 is moved to the rear surface side and housed within the frame.

Further, when the tray 30 is inserted, the disc table 23 should be moved to the upper surface side after the tray 30 is inserted to avoid the interference between the tray 30 and the disc table 23. This can be realized by a timing adjustment mechanism (not shown) provided between the tray 30 and the drive cam 50.

[Advantages of Recording Medium Driver]

In the above-described recording medium driver according to the present embodiment, the detection hole 34 is provided in the tray 30 on which the cartridge type recording medium 90 is mounted and housed, at the position corresponding to the position of the information hole 95 of the cartridge 92, and on the lower surface side of the detection hole 34, the detection lever 35 is provided on the back surface of the tray 30. Also, while the tray 30 is housed within the frame 10, on the lower surface side of the detection lever 35, the switch body 112 is provided on the bottom portion 11 of the frame 10. Owing to this, when being pushed down to the lower surface side, the lever head 351 of the detection lever 35 abuts to the switch pin 113 of the switch body 112 to push the switch pin 113 into the switch body 112, so that a predetermined signal can be output. Accordingly, since the information hole of the cartridge was conventionally detected by interlocking the base with the switch section, a space for securing the movement locus of the switch section was required. However, in the present embodiment, the base can separately be moved by fixing the switch section 111 on the frame 10. Thus, the information hole 95 of the cartridge 92 can be detected with the simple configuration, and the space efficiency can be enhanced. In addition, since the switch section is fixed on the frame 10, the wiring of the cables will not be complicated compared to a case in which, as the conventional way, the switch section is arranged on the base 20 that is vertically moved, so that the possibility of disconnection can be lowered while detection accuracy can be heightened.

Further, the detection lever 35 includes the lever head 351 and the lever pin 352, the plate spring 353 is attached to the lever head 351, the one end of the plate spring 353 is fixed on the back surface of the tray 30, and the detection lever 35 is constantly biased from the back surface side of the tray 30 to the mount surface 31 side. Therefore, the lever pin 352 can come up from or come down into the mount surface 31 via the detection hole 34 provided in the tray 30. Thus the lever pin 352 can easily detect the information hole 95 formed in the cartridge 92 when the cartridge 92 is mounted, thereby allowing the detection accuracy to be heightened. In addition, since the switch section is fixed to the frame 10, the wiring of the cables will not be complicated compared to a case in which, as the conventional way, the switch section is arranged on the base 20 that is vertically moved, so that the possibility of disconnection can be lowered while detection accuracy can be heightened.

Further, the lower portion of the lever head 351 is defined by a curved surface or by two or more planes. With this configuration, when being pushed down to the lower surface side, the lever head 351 can abut to the switch pin 113 substantially perpendicularly. Hence, the lever head 351 can securely push the switch pin 113, and avoids the switch pin 113 from being damaged since no excessive force is applied to the switch pin 113. Alternatively, the switch pin 113 may be two-way operation type allowing the switch pin 113 to be pushed from vertical and horizontal directions, which can prevent the damage thereof.

MODIFICATIONS OF EMBODIMENT

Note that the present invention is not limited to the above-described embodiments, and may include modifications, improvements, etc. as long as the object of the present invention can be attained.

Figure 7A:
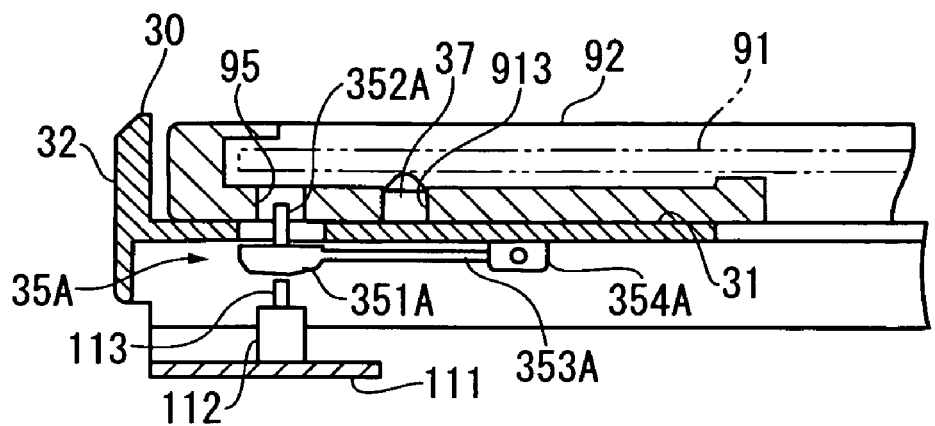
FIG. 7A is a cross section showing a detection lever of a recording medium driver according to a modification of the present embodiment.
Figure 7B:
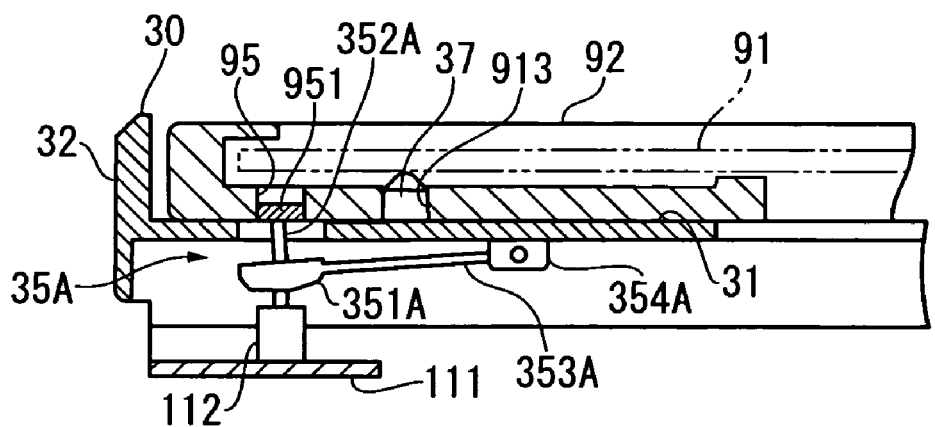
FIG. 7B is a cross section showing a state different from the modification in FIG. 7A.

For example, according to the recording medium driver of the present embodiment, although the detection lever 35 is biased to the mount surface 31 side from the back surface side of the tray 30 by way of the plate spring 353, it is not limited thereto. For example, as shown in FIGS. 7A and 7B, a detection lever 35A may rotatably be provided on a fixing portion 354A on the back side of the tray 30 to couple a lever head 351A with the fixing portion 354A by using a synthetic resin cover 353A. With this configuration, although the lever head 351A falls to the lower surface side due to its self weight, by setting the biasing force of the switch pin 113 to the upper surface side to be greater than the self weight of the lever head 351A, the switch pin 113 can be prevented from being pushed due to the self weight of the lever head. Also, with this configuration, the biasing force of the switch pin 113 causes the lever head 351A and a lever pin 352A to be biased from the back surface side of the tray 30 to the mount surface 31 side. When the cartridge type recording medium 90 is mounted on the tray 30, the lever head 351A and the lever pin 352A are advanced/retracted in the vertical direction according to the presence of the information hole 95 of the cartridge 92. For example, if the information hole 95 of the cartridge 92 is opened, the lever pin 352A is inserted to the information hole not to push down the switch pin 113 (see FIG. 7A). On the other hand, if the information hole 95 of the cartridge 92 is closed, the lever pin 352A is pushed down by the cartridge 92 to push the switch pin 113 (see FIG. 7B). With this configuration, the resilient member need not be provided on the detection lever 35 for utilizing the biasing force of the switch pin 113, and the configuration can further be simplified, thereby promoting decrease in manufacturing cost as well as in the number of components.

According to the recording medium driver of the present embodiment, although the mount surface 31 of the tray 30 includes the guiding projection 38 for positioning the bare disc type recording medium when the bare disc type recording medium being mounted, it is not limited thereto, and the guiding projection 38 may integrally be formed with the detection lever 35 to position the bare disc type recording medium.

In such case, the detection lever 35 and the detection hole 34 are provided in the vicinity of the outer periphery of the circular recessed portion on the mount surface 31 on which the bare disc type recording medium is mounted. With this configuration, the detection lever 35, when the cartridge type recording medium 90 is mounted on the mount surface 31 of the tray 30, in the same manner as the above-described embodiment, detects the information hole 95 of the cartridge 92 to acquire proper information. Further, when the bare disc type recording medium is mounted on the mount surface 31, the guiding projection 38 is projected from the mount surface 31 along the periphery of the circular recessed portion of the tray 30, so that the bare disc type recording medium can be prevented from being released or dropped. With this configuration, since the detection lever 35 can also serve as the guiding projection 38, the guiding projection 38 need not be formed additionally. Thus, the number of components as well as the manufacturing cost can be decreased.

Figure 8A:
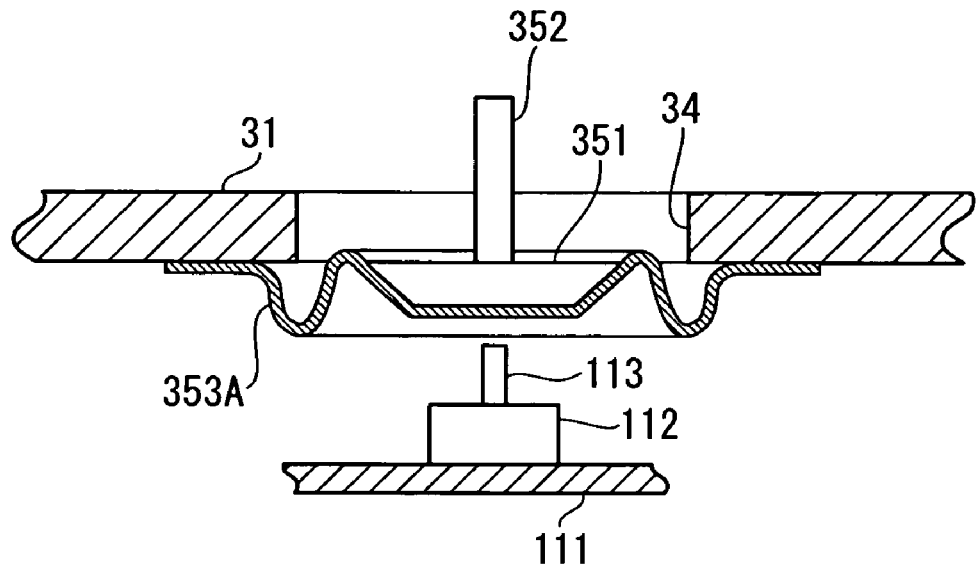
FIG. 8A is a cross section showing a detection lever according to another modification of the present embodiment.
Figure 8B:
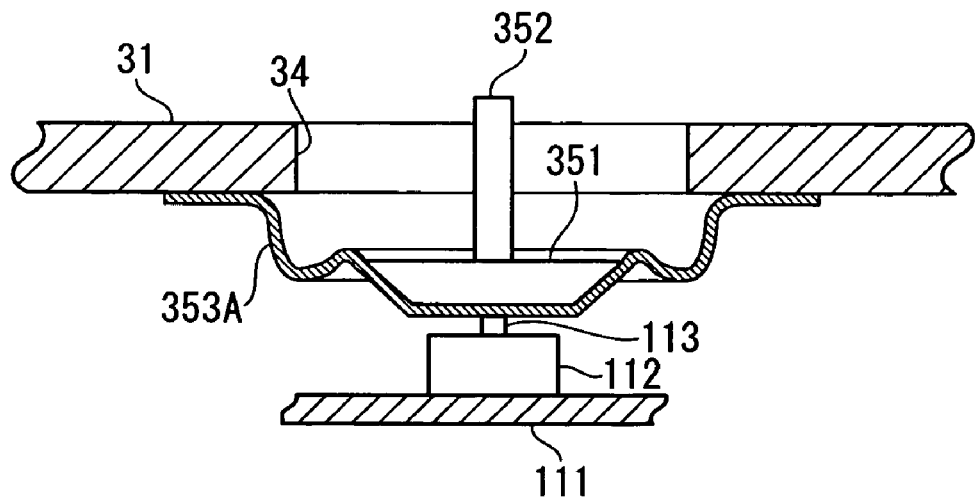
FIG. 8B is a cross section showing a state different from the modification in FIG. 8A.

Further, in the present embodiment, although the plate spring 353 is used as the resilient member for biasing the lever head 351 of the detection lever 35 to the mount surface 31 side, it is not limited thereto. For example, as shown in FIGS. 8A and 8B, the detection lever 35 may include the lever head 351 and the lever pin 352, and the lever head 351 may be covered with a resilient synthetic resin cover 353A from the lower surface side. In such case, during normal condition with the cartridge 92 not being mounted, the synthetic resin cover 353A biases the detection lever 35 to the mount surface 31 side as shown in FIG. 8A. Then, when the lever pin 352 is pushed down because the cartridge 92 is mounted etc., as shown in FIG. 8B, the lever pin 352 is pushed down, which further pushes the switch pin 113. With this configuration, the simple configuration causes the number of components to be decreased, thus decreasing the manufacturing cost.

Figure 9:
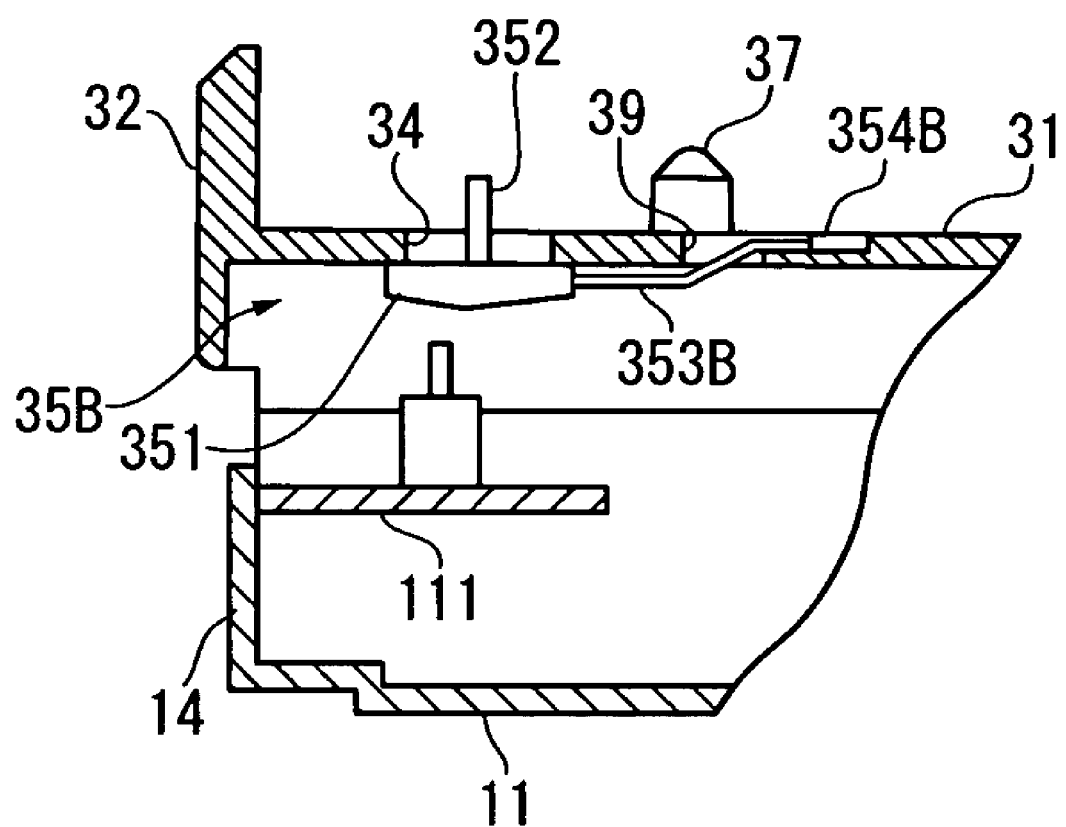
FIG. 9 is a cross section showing a detection lever according to still another modification of the present embodiment.

In the present embodiment, although the one end of the plate spring 353 is provided on the lever head 351 of the detection lever 35 while the other end thereof is fixed on the fixing portion 354 provided on the lower surface side of the tray 30, it is not limited thereto. For example, as shown in FIG. 9, one end of a plate spring 353B may be provided on the lever head 351 of a detection lever 35B while the other end thereof passes through a spring insertion hole 39 formed so as to penetrate from the lower surface side to the mount surface 31 side of the tray 30 and is fixed on a fixing portion 354B provided on the mount surface 31 side.

In the present embodiment, although the switch pin 113 is projected upwardly from the switch body 112, it is not limited thereto, and the switch body 112 may have a metal contacting portion on the upper surface thereof, and a conductive abutting portion that can abut on the contacting portion on the lower surface side of the lever head 351, the contacting portion detecting that the abutting portion abuts thereto and outputting a predetermined signal to the electric circuit. Since such configuration allows the switch section 111 to be further thin, thus decreasing the entire thickness of the driver.

ADVANTAGES OF EMBODIMENT

The detection hole 34 is provided in the tray 30 on which the cartridge type recording medium 90 is mounted, at the position corresponding to the position of the information hole 95 of the cartridge 92, and on the lower surface side of the detection hole 34, the detection lever 35 is provided on the back surface of the tray 30. Also, while the tray 30 is housed within the frame 10, on the lower surface side of the detection lever 35, the switch section 111 is provided on the bottom portion 11 of the frame 10. Accordingly, the switch section 111 can be separated from the motion of the base since the switch section 111 is fixed on the frame 10, and consequently, the information hole 95 of the cartridge 92 can be detected with the simple structure and the space efficiency can be enhanced.

INDUSTRIAL APPLICABILITY

The present invention is applicable to a recording medium driver and a recorder/reproducer of a cartridge type recording medium that accommodates a disc inside a cartridge.

The invention claimed is:

1. A recording medium driver that drives a recording medium including a cartridge and a disk accommodated in the cartridge, the cartridge including an information hole, whether the information hole is opened or closed indicating information related to a state of the recording medium, the recording medium driver comprising:
   a frame;
   a tray within the frame, the tray including a mount surface on which the recording medium is mounted and being capable of housing the recording medium;
   a detection section to come up from/come down into the mount surface of the tray and that is projected from the mount surface to detect that the information hole is opened; and
   a switch section disposed on a side of the frame to detect whether the detection section is come up or come down and to acquire the information related to the state of the recording medium, wherein
   the detection section includes a pin for detecting the information hole and a support portion for supporting the pin,
   the tray includes a detection hole through which the pin is inserted, and
   the recording medium driver includes a plate spring that constantly biases the support portion of the detection section from a back surface side opposite to the mount surface of the tray in a direction toward the mount surface, an end of the plate spring being fixed to the support portion and the other end of the plate spring being fixed to the tray.

2. The recording medium driver according to claim 1, wherein
   the tray allows a bare disc type recording medium to be mounted thereon, and
   the detection section positions the bare disc type recording medium.

3. The recording medium driver according to claim 1, wherein the detection section is mounted on the tray, and the switch is mounted on the frame.

4. A recorder/reproducer, comprising:
   a recording medium driver that drives a recording medium, the recording medium including a cartridge and a disk accommodated in the cartridge,
   the cartridge including an information hole, whether the information hole is opened or closed indicating information related to a state of the recording medium, wherein
   the recorder/reproducer records information on or reproduces information from the recording medium,
   the recording medium driver includes:
   a frame;
   a tray within the frame, the tray including a mount surface on which the recording medium is mounted and being capable of housing the recording medium within a frame,
   a detection section to come up from/come down into the mount surface of the tray and is projected from the mount surface to detect that the information hole is opened; and
   a switch section disposed on a side of the frame to detect whether the detection section is come up or come down and to acquire the information related to the state of the recording medium, wherein
   the detection section includes a pin for detecting the information hole and a support portion for supporting the pin.
   the tray includes a detection hole to which the pin is inserted, and
   the recording medium driver includes a plate spring that constantly biases the support portion of the detection section from a back surface side opposite to the mount surface of the tray in a direction toward the mount surface, an end of the plate spring being fixed to the support portion and the other end of the plate spring being fixed to the tray.

5. The recorder/reproducer according to claim 4, wherein the detection section is mounted on the tray, and the switch is mounted on the frame.

* * * * *

UNITED STATES PATENT AND TRADEMARK OFFICE
CERTIFICATE OF CORRECTION

| | | |
|---|---|---|
| PATENT NO. | : 7,650,610 B2 | Page 1 of 1 |
| APPLICATION NO. | : 10/589254 | |
| DATED | : January 19, 2010 | |
| INVENTOR(S) | : Yoshimitsu Fukushima et al. | |

It is certified that error appears in the above-identified patent and that said Letters Patent is hereby corrected as shown below:

On the Title Page:

Item "(86)" the date printed should read as: --Aug. 11, 2006--

Signed and Sealed this

Ninth Day of March, 2010

David J. Kappos
*Director of the United States Patent and Trademark Office*